United States Patent [19]
Vali

[11] Patent Number: 4,853,527
[45] Date of Patent: Aug. 1, 1989

[54] CONTROLLED ACCELERATION DECELERATION CIRCUIT FOR OPTICAL TRACERS

[75] Inventor: Enn Vali, Burlington, Canada

[73] Assignee: Westinghouse Canada Inc., Hamilton, Canada

[21] Appl. No.: 167,913

[22] Filed: Mar. 14, 1988

[30] Foreign Application Priority Data

Jun. 4, 1987 [CA] Canada .................................. 538841

[51] Int. Cl.4 .............................................. G05B 1/00
[52] U.S. Cl. ..................................... 250/202; 318/577
[58] Field of Search ......................... 250/202; 318/577

[56] References Cited

U.S. PATENT DOCUMENTS

| | | | |
|---|---|---|---|
| 3,704,372 | 11/1972 | Parker et al. | 250/202 |
| 3,832,544 | 8/1974 | Landy, Jr. | 250/202 |
| 3,883,735 | 5/1975 | Murphy et al. | 250/202 |
| 4,049,962 | 9/1977 | Kaller | 250/202 |
| 4,625,104 | 11/1986 | Parker et al. | 250/202 |

*Primary Examiner*—David C. Nelms
*Assistant Examiner*—Michael Messinger
*Attorney, Agent, or Firm*—Edward H. Oldham

[57] ABSTRACT

In an optical line tracer sudden changes of velocity can cause instability and vibration. Means are provided to limit acceleration or deceleration to a specific rate of change. Speed change signals are processed through a ramp circuit which converts the step function signal to a ramp function before application.

5 Claims, 3 Drawing Sheets

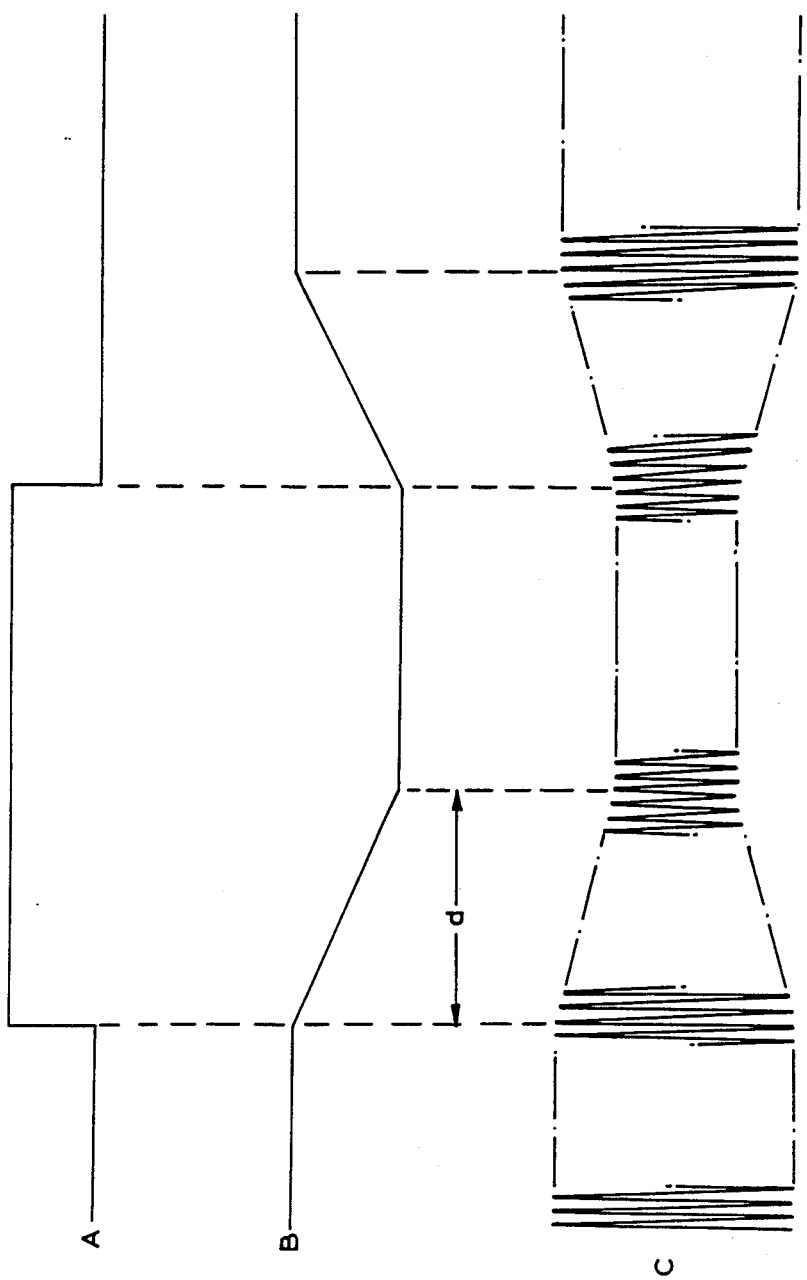

CONTROLLED ACCELERATION DECELERATION CIRCUIT FOR OPTICAL TRACERS

BACKGROUND OF THE INVENTION

1. Field of the Invention:

This invention relates to optical tracers and in particular to improved acceleration deceleration circuits for such tracers.

2. Description of the Prior Art:

Optical pattern tracers are well known in the machine tool field and are commonly used to control the cutting of various machine tools, particularly gas and some cutting machines, which may be caused to cut specific shapes from material based upon a predetermined optical pattern. One class of such pattern tracers is an optical pattern tracer which views a pattern such as a dark silhouette or line on a white surface and causes the tracer and its associated machine tool to follow the convolution of the pattern. One of the preferred forms of optical tracers, scans a circular area repetitively across the edge of the pattern and producing an electrical signal representative of the change of reflectance as the scanning action crosses the edge of the pattern. This electrical signal is then used together with reference signals and other information to produce coordinate drive information to control X and Y drive motor which cause the machine to move with constant tangential velocity around the pattern. Typical of tracers of this class are those described in U.S. Pat. No. 3,704,372, issued Nov. 28, 1972 to Robert E. Parker, et al., U.S. Pat. No. 3,727,120, issued Apr. 10, 1973 to George Jewell, et al., U.S. Pat. No. 3,860,862, issued Jan. 14, 1975 to William Dell, et al., and U.S. Pat. No. 3,883,735, issued May 13, 1975 to Francis P. Murphy, et al.

In many such tracers the tracing velocity is changed not only at the beginning and end of a trace, but also during certain convolutions, for example, on certain corners and at times when other procedures are required. This slowdown may be initiated either by a special mark on the pattern or by the mere existence of a rapid change of direction or, in the simplest form, such a slowdown may be initiated by the operator by operating operation of a suitable switch, pushbuttom, etc.

In all of these situations, the change in velocity tends to be a step function, abruptly changing from one velocity to a higher or lower velocity. It will be obvious that such step changes in the velocity may cause the machine to vibrate or shake, due to the demand for maximum acceleration or deceleration. Such vibrations will cause imperfections in the cut or tracing action.

SUMMARY OF THE INVENTION

In accordance with the present invention, changes in velocity caused by the slowdown circuit or by startup or stopping of the machine are caused to follow a specific rate of change, i.e., a ramp. It is not desirable to place this ramp circuit in the speed control circuit, since this would prevent the machine from responding to normal tracing demands. The ramp function is therefore introduced at another point in the electronic circuitry.

In the systems described in the foregoing United States patents, the desired X and Y coordinates signals are produced by sampling sine and cosine wave forms, at times determined by a tracer sampling signal, which signal corresponds to the relative position of the pattern and the scan.

In accordance with the present invention, the sine and cosine waves, which are to be sampled by the sample and hold circuits, are controlled in amplitude by the speed change circuit. In steered head systems where sine and cosine voltages are generated at the tracing head, which sine and cosine voltages indicate the direction of the tracing head, such sine and cosine reference voltages are varied in accordance with the ramp function.

BRIEF DESCRIPTION OF THE DRAWINGS

A clearer understanding in my invention may be had from a consideration of the following description of the drawings in which:

FIG. 3 is a representation of the wave form at certain points in the circuit.

DESCRIPTION OF THE PREFERRED EMBODIMENT

Figure 1:
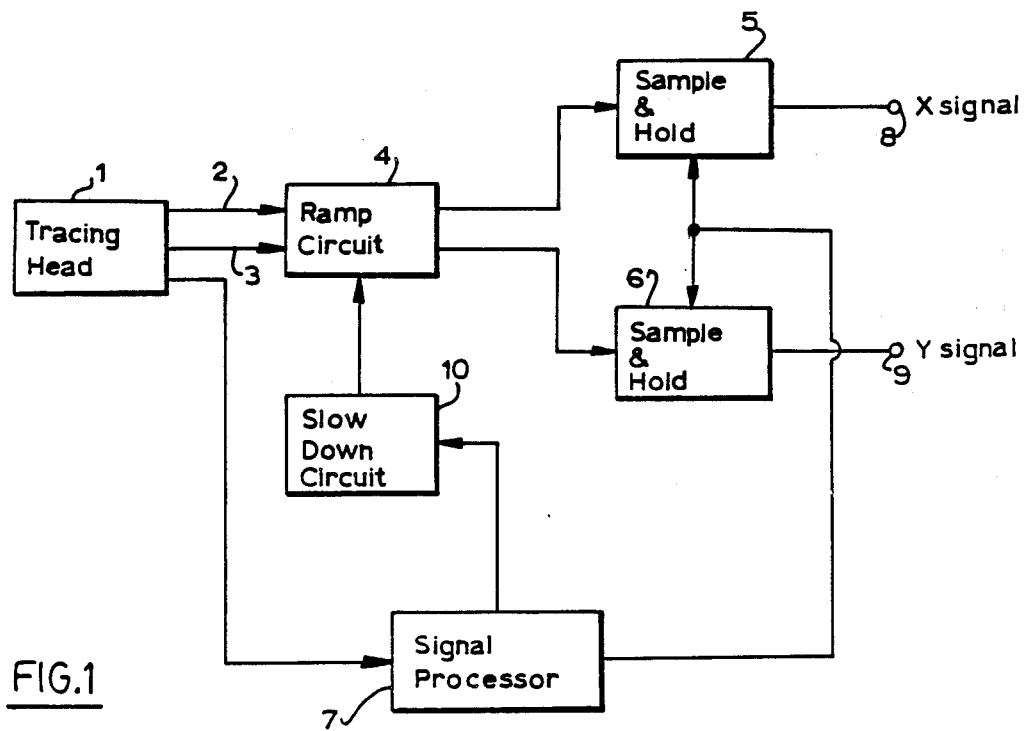
FIG. 1 is a block diagram of a preferred embodiment of a sample and hold tracing system utilizing my invention.

Considering first FIG. 1, there is shown a simplified block diagram of a nonsteered head tracing system. The tracing head 1 provides a sine and cosine signal on conductors 2 and 3. These sine and cosine signals are controlled by the ramp circuit 4 and applied with selectable amplitude to the sample and hold circuits 5 and 6. The photocell output from the tracing head is applied to the signal processor 7 and a sampling signal representative of the time of occurrence of the intersection of the trace and the pattern is applied to the sample and hold circuits from the signal processor. The sample and hold circuits produce from these signals, suitable coordinate drive signals, which appear at terminals 8 and 9. The system also includes a slowdown circuit 10, which may be manually activated or activated by a signal from the signal processor 7. The output from the slowdown circuit is applied to the ramp circuit 4.

In operation, the output from sample and hold circuit 5, for example, is determined by the value of the sinusoid applied to it from the ramp circuit, at the time determined by the time of occurrence of the sampling signal from the signal processor. It will be evident therefore, that the output at terminal 8 is a function of the amplitude of the sine wave applied to the sample and hold circuit. Upon the occurrence of a slowdown, either indicated by a signal received from the signal processor or by a manually introduced signal provided by the operator, the output from the slowdown circuit applied to the ramp circuit changes in a step function. The ramp circuit, however, is arranged so that this step function generates a ramp of predetermined slope and amplitude, which controls the output amplitude of the sine waves passing through it. Thus, the sine wave applied to the sample and hold circuit 5, rather than abruptly changing amplitude, when a slowdown signal is received, changes in a controlled manner from a first value to a second value. The output from the sample and hold circuits, which controls the coordinate drive system, therefore varies in a similar manner.

Figure 2:
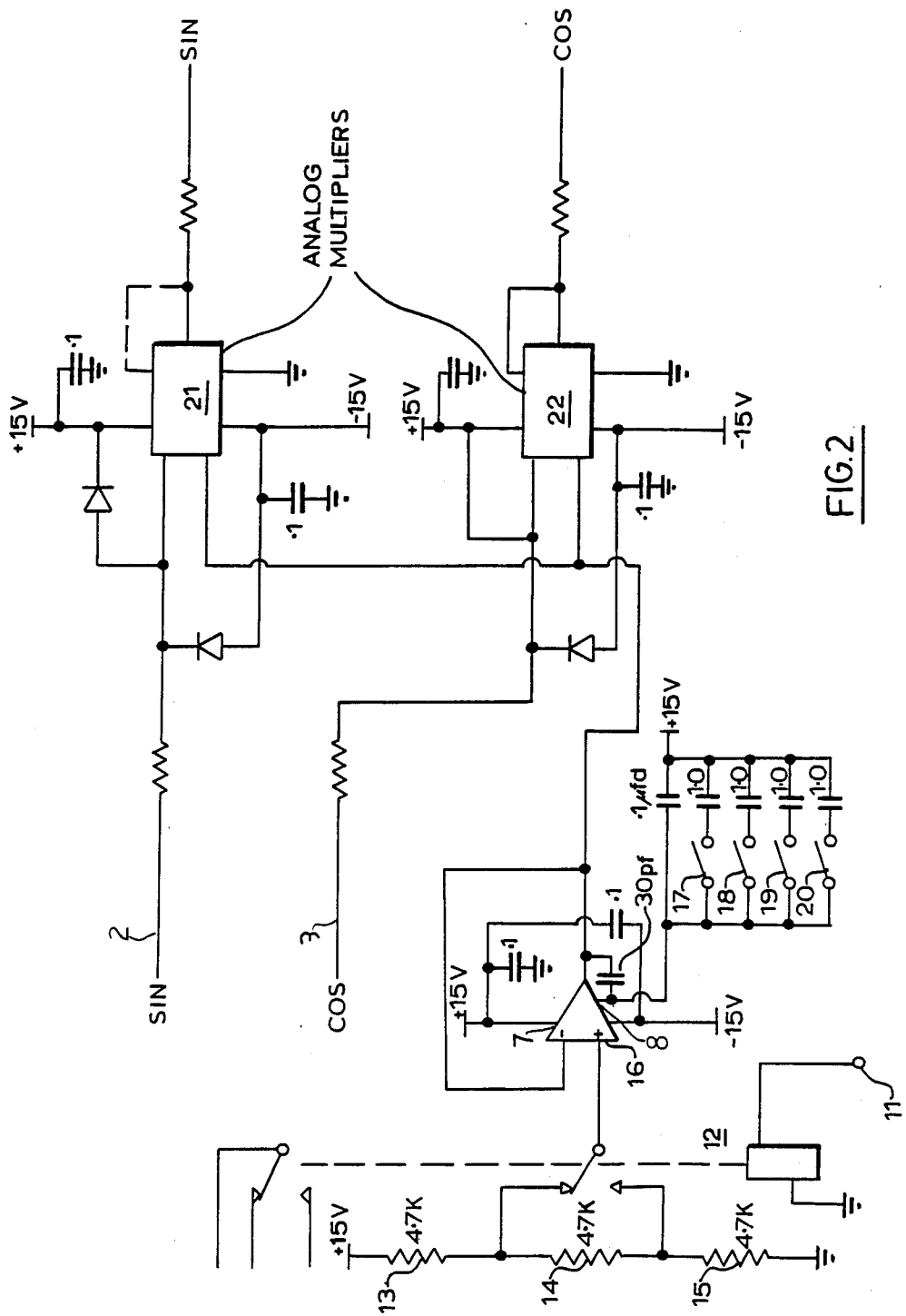
FIG. 2 is a schematic circuit diagram of the ramp circuit of FIG. 1.

Turning now to FIG. 2, a detailed circuit diagram of the ramp circuit 4 is shown. The input from the slowdown circuit is applied to terminal 11, which operates a relay 12 having a plurality of contacts, including a single-pole double-throw portion which connects the moving of the contact, either between resistors 13 and 14 or 14 and 15 of the potentiometer, comprising resistors 13, 14 and 15, connected from a suitable volt source of potential to ground. The output from the moving contact is applied to the noninverting terminal of operational amplifier 16 and the output of the operational amplifier 16 is coupled back to the inverting input of the operational amplifier, in a unity gain noninverting configuration. Alternatively an inverting configuration may be used.

Suitable potentials are applied to terminals 7 and 8 of the operational amplifier. A selectable capacity is coupled between terminal 8 of the operational amplifier and a suitable potential. A plurality of swithces 17, 18, 19 and 20 permit selection of the desired capacity between terminal 8 and the potential. When connected in this manner, the operational amplifier output goes from a first voltage to a second voltage at a linear rate determined by the value of the capacitor connected to terminal 8, when the input to the plus terminal of the operational amplifier is switched from a first value to a second value. With the values shown, the ramp produced may have a duration in the order of one half second. Other forms of ramp generators may be used for this purpose.

This ramp function is applied to a pair of analog multipliers 21 and 22. Also connected to the analog multipliers are the conductors 2 and 3 which apply to them the sine and cosine waves from the tracing head. The output of these analog multipliers is, in the case of multiplier 21, the sine voltage times the ramp voltage applied from operational amplifier 16 divided by 10. Similarly, the output from analog multiplier 22 is the cosine voltage times the ramp function applied from operational amplifier 16 divided by 10. The output from these multipliers is then applied to the sample and hold circuits, as shown in FIG. 1.

Operation

A clearer understanding of the operation of the system described, may be had from a consideration of FIG. 3, which is a series of wave forms. Wave form A in FIG. 3 represents the potential applied to terminal 11 in FIG. 2. As will be seen, the potential abruptly changes from a first value to a second value, indicating a slowdown. Wave form B, presents the output from operational amplifier 16. As will be seen, the abrupt changes in wave form A have been converted to slope changes or ramps. The time d in wave form B is a function of the value of the capacity connected to terminal 8, that is, the number of swithces 17, 18, 19 and 20 closed. The time d may be in the order of 0.5 seconds. The larger the capacity the more gradual the ramp and the longer the period d.

Wave form C, represents the output from the analog multipliers and as will be seen, the amplitude of the sine wave gradually changes from a first amplitude to a second lesser amplitude over a period of time, equal to period d. It will be evident that with this arrangement, there is no abrupt change in velocity of the system and the machine is therefore not subject to impulses or abrupt changes in attempting to attain a change in velocity in zero time.

While the invention has been described specifically in relation to a circuit using a sample and hold circuitry, it will be evident that a similar arrangement can be applied to tracers incorporating sine and cosine voltage generators such as those used in steered head systems. In tracing heads where the amplitude of the sine and cosine produced are dependent on a reference voltage the output from the operational amplifier would be directly applied to the tracing head as a reference voltage.

It will also be evident that while the invention has been illustrated with reference to a tracing system which produces both a sine and cosine output, it will have equal application to those situations where a single sinusoid is produced and from it a pair of sinusoids are produced right angles to each other. It should be understood that the slowdown circuit 10, of FIG. 1, which produces a step function, which is applied to terminal 11, may be a simple switch controlled by the operator or may be a complex circuit which derives a signal from the tracing head, either by means of command marks on the pattern or by means of advanced detection which indicates when there is an abrupt change or direction of the tracing head.

I claim:

1. A control circuit for a co-ordinate drive optical pattern tracing machine wherein the output of a pair of sample and hold circuits produces output signals, the amplitude of which determines the speeds of the X and Y co-ordinate drive motors through a servo amplifier loop of said tracers, said sample and hold circuits each being fed with two signals produced in the tracing head; a first signal being a sinusoid co-ordinate signal and the second signal corresponding to the line intercept signal, a slowdown circuit for producing slowdown signals in response to some predetermined stimulus, a ramp function generator being connected between said tracing head and said sample and hold circuits so as to be able to modulate said sinusoid co-ordinate signals in accordance with some predetermined pattern upon the receipt of a slowdown signal produced in the slowdown circuit.

2. A drive system as claimed in claim 1, wherein said coordinate sinusoidal voltages and said ramp functions are applied to a pair of analog multipliers and the outputs of said multipliers are applied to said sample and hold circuits.

3. A drive system as claimed in claim 1, wherein said slowdown circuit comprises a speed control relay.

4. A drive system as claimed in claim 3, wherein the output of said speed control relay is applied to a ramp function generator.

5. A drive system as claimed in claim 4, wherein said coordinate sinusoidal voltages and said ramp functions are applied to a pair of analog multipliers and the outputs of said multipliers are applied to said sample and hold circuits.

* * * * *